(12) United States Patent
Egg

(10) Patent No.: US 10,873,404 B2
(45) Date of Patent: Dec. 22, 2020

(54) SYSTEM AND METHOD FOR DIGITAL DIRECTION FINDING

(71) Applicant: Benjamin J. Egg, Manti, UT (US)

(72) Inventor: Benjamin J. Egg, Manti, UT (US)

( * ) Notice: Subject to any disclaimer, the term of this patent is extended or adjusted under 35 U.S.C. 154(b) by 336 days.

(21) Appl. No.: 16/035,584

(22) Filed: Jul. 13, 2018

(65) Prior Publication Data

US 2019/0137593 A1 May 9, 2019

Related U.S. Application Data

(60) Provisional application No. 62/531,881, filed on Jul. 13, 2017.

(51) Int. Cl.
| | |
|---|---|
| *H04B 15/00* | (2006.01) |
| *H04B 1/10* | (2006.01) |
| *G05D 1/12* | (2006.01) |
| *H04B 1/04* | (2006.01) |
| *H04K 3/00* | (2006.01) |
| *G01S 1/30* | (2006.01) |

(52) U.S. Cl.
CPC .............. *H04B 15/00* (2013.01); *G01S 1/302* (2013.01); *G05D 1/12* (2013.01); *H04B 1/0475* (2013.01); *H04B 1/1081* (2013.01); *H04K 3/44* (2013.01)

(58) Field of Classification Search
CPC .... H04B 15/00; H04B 1/0071; H04B 1/0475; H04B 1/1081; H04B 1/40; H04B 7/18506; H04B 7/18513; H04B 7/1858; H04B 7/18582; G01S 19/393; G01S 1/302; G01S 5/0294; G05D 1/12; G06F 21/602; H04K 3/44
See application file for complete search history.

(56) References Cited

U.S. PATENT DOCUMENTS

| | | | | |
|---|---|---|---|---|
| 4,172,226 A | * | 10/1979 | Rubin | G01T 1/2907 250/362 |
| 5,712,641 A | * | 1/1998 | Casabona | G01S 19/21 342/362 |
| 5,822,429 A | * | 10/1998 | Casabona | G01S 19/015 380/252 |
| 6,839,017 B1 | * | 1/2005 | Dillman | G01S 5/04 342/146 |
| 8,937,707 B2 | * | 1/2015 | Jansen | G03F 7/70516 355/55 |
| 2013/0050675 A1 | * | 2/2013 | Jansen | G03F 7/70516 355/72 |
| 2013/0066597 A1 | * | 3/2013 | Van Beurden | G03F 1/84 703/1 |
| 2015/0102959 A1 | * | 4/2015 | Lier | H04B 7/18515 342/354 |
| 2020/0013685 A1 | * | 1/2020 | Van Leest | G01N 21/9501 |

FOREIGN PATENT DOCUMENTS

| | | | | |
|---|---|---|---|---|
| CN | 102216736 A | * | 10/2011 | ............. G01N 21/45 |
| EP | 2515168 A2 | * | 10/2012 | ............... G03F 1/84 |

* cited by examiner

*Primary Examiner* — Peter M Bythrow
*Assistant Examiner* — Nuzhat Pervin
(74) *Attorney, Agent, or Firm* — Malone IP Law; Steven J. Malone

(57) ABSTRACT

A method for finding an orthogonal direction of a radiation source with respect a digitally optimized interference pattern of a first fixed electromagnetic element and a second fixed electromagnetic element has been established. Determining a direction of a radiation source allows for dynamic control of moving object.

20 Claims, 4 Drawing Sheets

SYSTEM AND METHOD FOR DIGITAL DIRECTION FINDING

RELATED APPLICATIONS

This application claims priority to U.S. Provisional Application Ser. No. 62/531,881 titled "High Speed Data Sampling For Filtering, Recreating GPS Signals, and High Speed Communications" filed on Jul. 13, 2017 which is hereby incorporated by reference, in its entirety, for all it teaches and discloses.

FIELD OF THE INVENTION

The present invention discloses a system and method for digital direction finding.

SUMMARY

A method for finding an orthogonal direction of a radiation source with respect a digitally optimized interference pattern of a first fixed electromagnetic element and a second fixed electromagnetic element includes: one or more processors including non-transitory memory programmed to: detect a first signal associated with the first fixed electromagnetic element, the first signal transmitted by the radiation source; detect a second signal associated with the second fixed electromagnetic element, the second signal transmitted by the radiation source; recursively digitally phase shift the first detected signal and/or the second detected signal to create a changing interference pattern; sample the changing interference pattern while digitally phase shifting the first detected signal and/or the second detected signal to obtain the digitally optimized interference pattern, wherein the digitally optimized interference pattern is formed by destructive interference between the first signal and the second signal to obtain a local minima associated with the destructive interference; bisect the digitally optimized interference pattern about the local minima forming a reference line or a reference plane; determine the orthogonal direction of the radiation source using the reference line or the reference plane; and use the determined orthogonal direction of the radiation source with respect to the digitally optimized interference pattern of the first fixed electromagnetic element and the second fixed electromagnetic element to at least partially control a vehicle, a flying device, an electronic device, a satellite, an autonomous vehicle, a projectile, an autonomous robot, a tracking system, or a combination thereof.

The method digitally optimized interference pattern may contain maximum near-field interference associated with the fixed positions of the first fixed electromagnetic element and the second fixed electromagnetic element. The fixed positions of the first fixed electromagnetic element and the second fixed electromagnetic element may be spaced apart less than 1 wavelength of the first signal or the second signal. The fixed positions of the first fixed electromagnetic element and the second fixed electromagnetic element may be spaced apart less than ½ wavelength of the first signal and/or the second signal. The fixed positions of the first fixed electromagnetic element and the second fixed electromagnetic element may be spaced apart approximately ¼ wavelength or ¼ wavelength multiples of the first signal and/or the second signal. The local minima of the digitally optimized interference pattern may be a maximized local minima of the destructive interference between the first signal and the second signal. The bisection of the digitally optimized interference pattern may be a symmetrical bisection about an axis formed by the local minima. The fixed positions of the first fixed electromagnetic element and the second fixed electromagnetic element may be intentionally spaced apart to cause destructive interference between the first signal and the second signal. The digitally optimized interference pattern may be a digitally optimized near-field interference pattern. The first fixed electromagnetic element and the second fixed electromagnetic element may be co-located on the same printed circuit board. The first fixed electromagnetic element and the second fixed electromagnetic element may be electrical elements of an integrated circuit chip package. The first fixed electromagnetic element and the second fixed electromagnetic element may be electrical antennas. The first fixed electromagnetic element and the second fixed electromagnetic element may be at least partially encapsulated in a common medium. The first fixed electromagnetic element and the second fixed electromagnetic element may be similar electrical antennas. The first fixed electromagnetic element and the second fixed electromagnetic element may be non-similar electrical antennas. The first fixed electromagnetic element or the second fixed electromagnetic element may be a ground plane of a printed circuit board. The first fixed electromagnetic element or the second fixed electromagnetic element may be a planar micro-strip antenna. The first fixed electromagnetic element and/or the second fixed electromagnetic element may be printed antennas. The first fixed electromagnetic element and the second fixed electromagnetic element may be separated by a dielectric layer of a printed circuit board. The radiation source may be a moving electromagnetic radiation source.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings.

Figure 1:
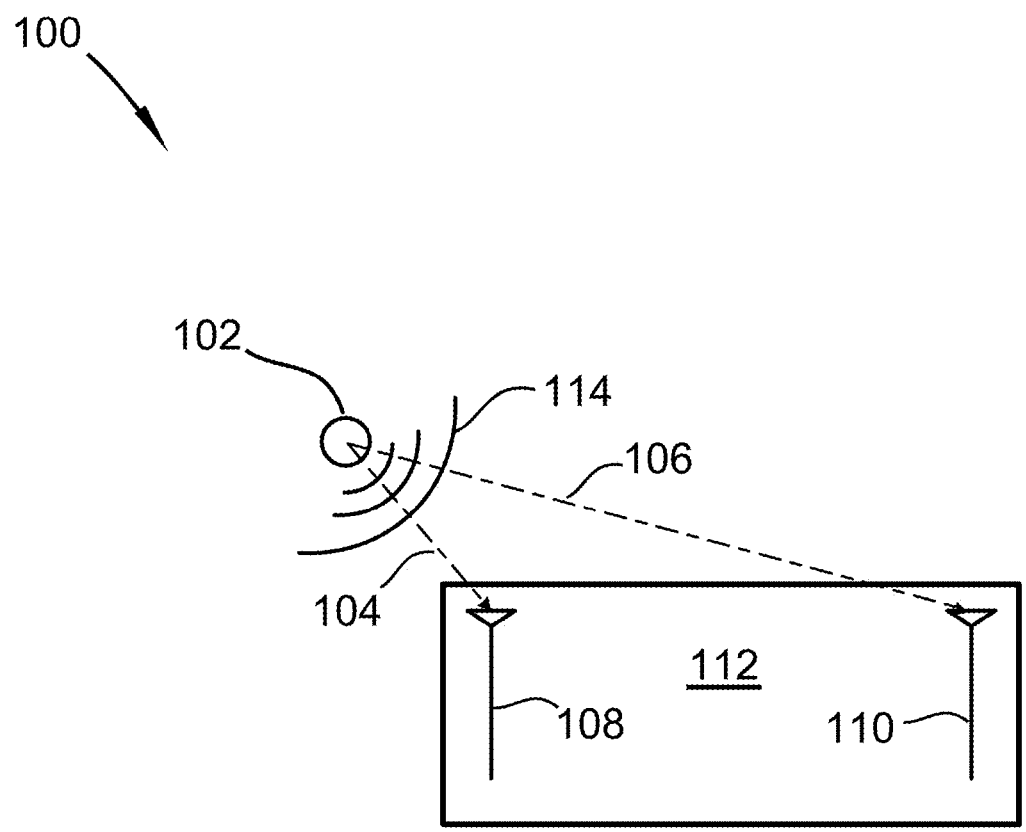
FIG. 1 shows a direction finding antenna system in accordance with an embodiment of the invention.

FIG. 1 shows a direction finding system and method 100 including a radiation source 102, electromagnetic radiation 114, a first signal 104 and a first element 108, a second signal 106 and a second element 110, and a common circuit board 112. In one embodiment, antenna element 108 and antenna element 110 create an interference pattern relative to the positioning of each antenna when receiving a radiated signal 114 by way of signals 104 and 106. The method includes: detecting a first signal 104 associated with the first fixed electromagnetic element 108, the first signal transmitted by the radiation source 102; detect a second signal 106 associated with the second fixed electromagnetic element 110, the second signal transmitted by the radiation source 102; recursively digitally phase shift the first detected signal and/or the second detected signal to create a changing interference pattern using one or more processors; sampling the changing interference pattern while digitally phase shifting the first detected signal and/or the second detected signal to obtain the digitally optimized interference pattern, wherein the digitally optimized interference pattern is formed by destructive interference between the first signal and the second signal to obtain a local minima associated with the destructive interference; bisecting the digitally optimized interference pattern about the local minima forming a reference line or a reference plane; determining the orthogonal direction of the radiation source using the reference line or the reference plane; and using the determined orthogonal direction of the radiation source with respect to the digitally optimized interference pattern of the first fixed electromagnetic element and the second fixed electromagnetic element to at least partially control a vehicle, a flying device, an electronic device, a satellite, an autonomous vehicle, a projectile, an autonomous robot, a tracking system, or a combination thereof.

Each of the antennas create a shadow on the other antenna with respect to a specific wave front leaving the transmitter. With fast sampling and digital signal processing, an optimized local minima or a point at which interference is maximized creates a deep null in the overlapping interference patterns which is detectable by digital signal processing. When the deepest null or greatest interference is detected and a line bisects the null or interference through a center of the transmission pattern, the bisected plane is perpendicular to a direction of the radiation source.

Figure 2:
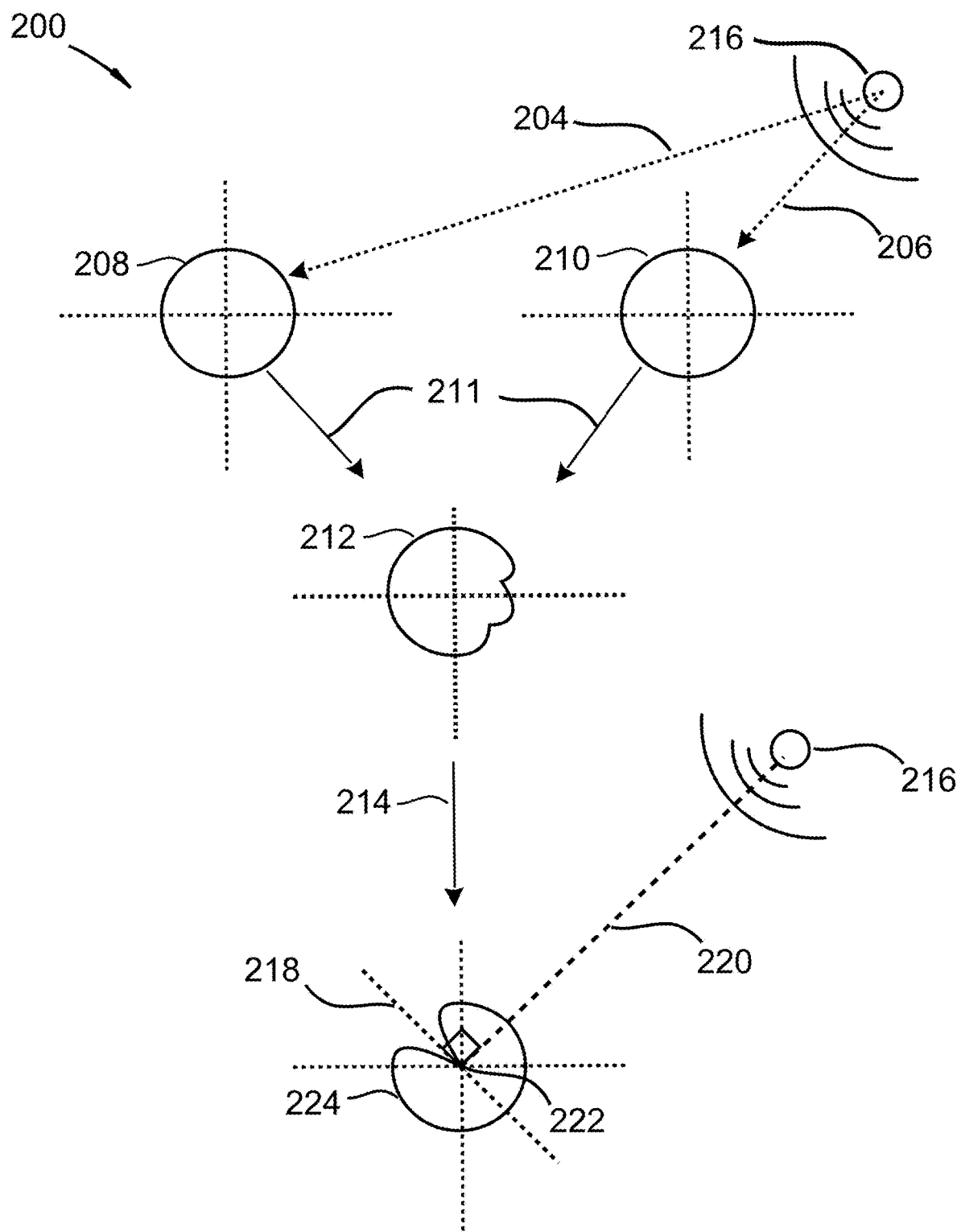
FIG. 2 shows a direction finding antenna method in accordance with an embodiment of the invention.

FIG. 2 illustrates a method 200 described in relation to FIG. 1. The method includes: detecting a first signal 204 associated with the first fixed electromagnetic element 208, the first signal transmitted by the radiation source 216; detect a second signal 206 associated with the second fixed electromagnetic element 210, the second signal transmitted by the radiation source 216; recursively digitally phase shift the first detected signal and/or the second detected signal to create a changing interference pattern 216 using one or more processors; sampling the changing interference pattern while digitally phase shifting the first detected signal and/or the second detected signal to obtain the digitally optimized interference pattern 224, wherein the digitally optimized interference pattern is formed by destructive interference between the first signal and the second signal to obtain a local minima 222 associated with the destructive interference; bisecting 218 the digitally optimized interference pattern about the local minima forming a reference line or a reference plane 218; determining the orthogonal direction 220 of the radiation source 216 using the reference line or the reference plane; and using the determined orthogonal direction of the radiation source with respect to the digitally optimized interference pattern of the first fixed electromagnetic element and the second fixed electromagnetic element to at least partially control a vehicle, a flying device, an electronic device, a satellite, an autonomous vehicle, a projectile, an autonomous robot, a tracking system, or a combination thereof.

Each of the antennas create a shadow on the other antenna with respect to a specific wave front leaving the transmitter. With fast sampling and digital signal processing, an optimized local minima or a point at which interference is maximized creates a deep null in the overlapping interference patterns which is detectable by digital signal processing. When the deepest null or greatest interference is detected and a line bisects the null or interference through a center of the transmission pattern, the bisected plane is perpendicular to a direction of the radiation source.

Figure 3:
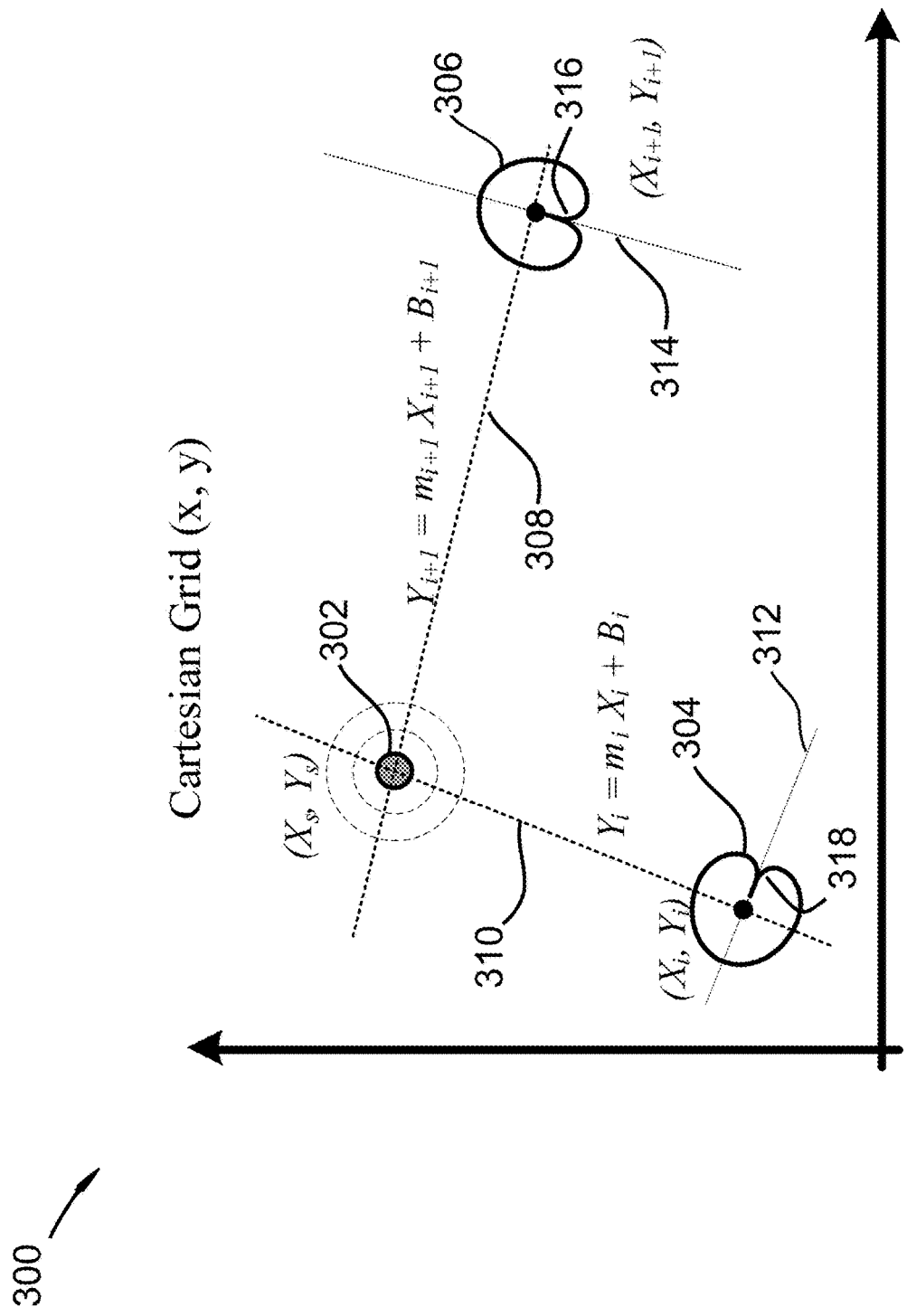
FIG. 3 shows a direction finding antenna method in accordance with an embodiment of the invention.

FIG. 3, illustrates a method 300 of pin pointing a radiation source using a pair of antenna pairs (two of FIG. 1). The method includes: bisecting 312 a first digitally optimized interference pattern about the local minima 318 forming a reference line or a reference plane 312 and determining the orthogonal direction 310 of the radiation source 302 using the reference line or the reference plane of a first pair of antennas; and bisecting 314 the second digitally optimized interference pattern about the local minima 316 forming a reference line or a reference plane 312 and determining the orthogonal direction 308 of the radiation source 302 using the reference line or the reference plane of a second pair of antennas; and determining the radiation source 302 to be at the intersection 302 of the first and second orthogonal directions.

Each of the antennas create a shadow on the other antenna with respect to a specific wave front leaving the transmitter. With fast sampling and digital signal processing, an optimized local minima or a point at which interference is maximized creates a deep null in the overlapping interference patterns which is detectable by digital signal processing. When the deepest null or greatest interference is detected and a line bisects the null or interference through a center of the transmission pattern, the bisected plane is perpendicular to a direction of the radiation source.

Figure 4:
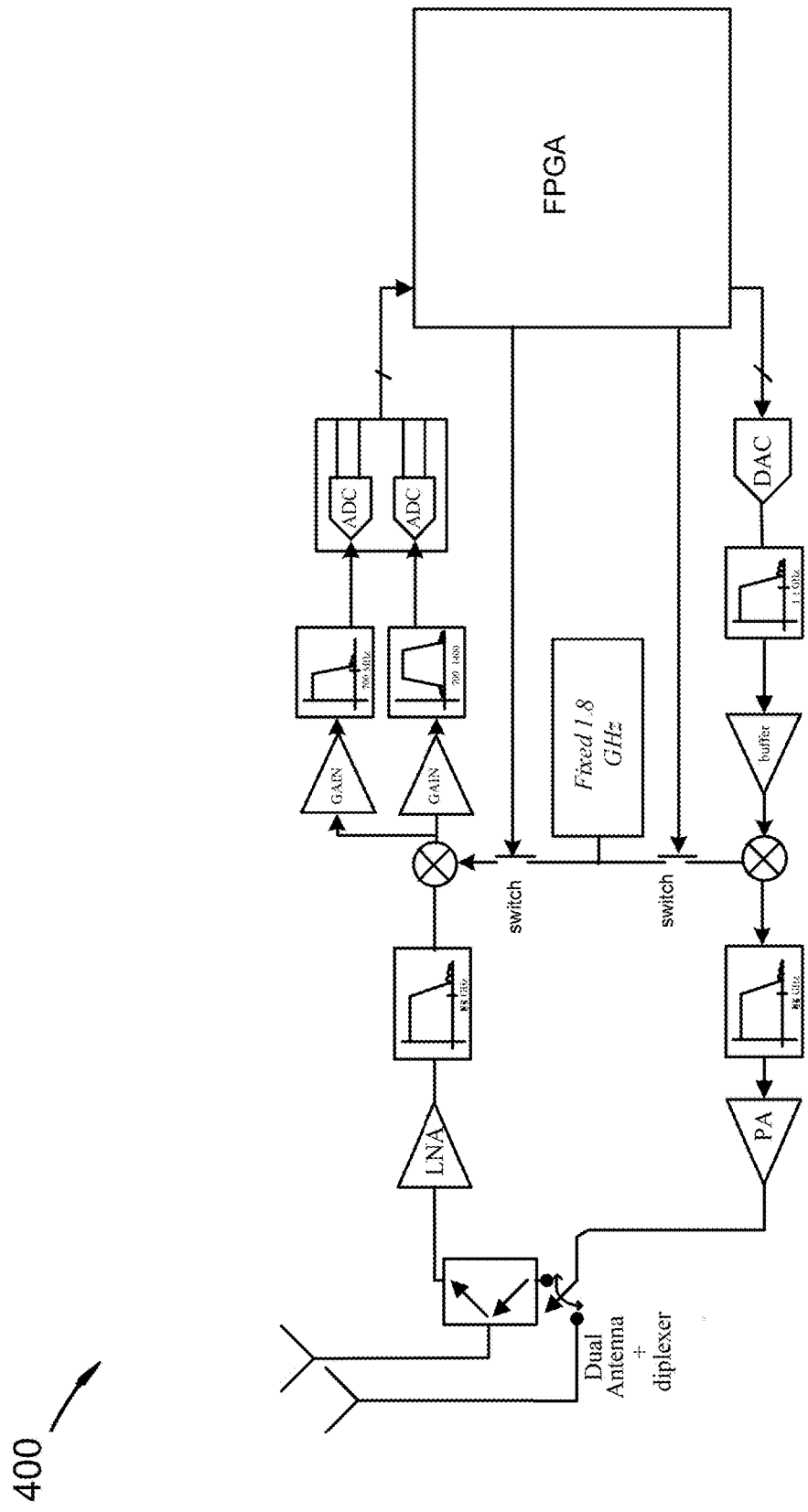
FIG. 4 show a a direction finding antenna system in accordance with an embodiment of the invention.

FIG. 4, shows a function block diagram of a system for detecting, sampling, and processing interference patterns of the direction finding invention. A dual antenna diplexer is used to receive the radiation energy at the first antenna and the second antenna. Fast sampling at 1.8 GHz or higher is needed to sample differences between the two antenna interference patterns. Data sampled is processed by a FPGA with parallel data processing techniques. DAC, ADC, LNA and PA are used to condition, filter and detect signals in accordance know digital signal processing techniques.

The systems and methods disclosed herein may be embodied in other specific forms without departing from their spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for finding an orthogonal direction of a radiation source with respect a digitally optimized interference pattern of a first fixed electromagnetic element and a second fixed electromagnetic element comprising:
   detect a first signal associated with the first fixed electromagnetic element, the first signal transmitted by the radiation source;

detect a second signal associated with the second fixed electromagnetic element, the second signal transmitted by the radiation source;

recursively digitally phase shift the first detected signal and/or the second detected signal to create a changing interference pattern;

sample the changing interference pattern while digitally phase shifting the first detected signal and/or the second detected signal to obtain the digitally optimized interference pattern, wherein the digitally optimized interference pattern is formed by destructive interference between the first signal and the second signal to obtain a local minima associated with the destructive interference;

bisect the digitally optimized interference pattern about the local minima forming a reference line or a reference plane;

determine the orthogonal direction of the radiation source using the reference line or the reference plane; and use the determined orthogonal direction of the radiation source with respect to the digitally optimized interference pattern of the first fixed electromagnetic element and the second fixed electromagnetic element to at least partially control a vehicle, a flying device, an electronic device, a satellite, an autonomous vehicle, a projectile, an autonomous robot, a tracking system, or a combination thereof.

2. The method of claim 1, wherein the digitally optimized interference pattern contains maximum near-field interference associated with the fixed positions of the first fixed electromagnetic element and the second fixed electromagnetic element.

3. The method of claim 1, wherein the fixed positions of the first fixed electromagnetic element and the second fixed electromagnetic element are spaced apart less than 1 wavelength of the first signal or the second signal.

4. The method of claim 1, wherein the fixed positions of the first fixed electromagnetic element and the second fixed electromagnetic element are spaced apart less than ½ wavelength of the first signal and/or the second signal.

5. The method of claim 1, wherein the fixed positions of the first fixed electromagnetic element and the second fixed electromagnetic element are spaced apart approximately ¼ wavelength or ¼ wavelength multiples of the first signal and/or the second signal.

6. The method of claim 1, wherein the local minima of the digitally optimized interference pattern is a maximized local minima of the destructive interference between the first signal and the second signal.

7. The method of claim 1, wherein the bisection of the digitally optimized interference pattern is a symmetrical bisection about an axis formed by the local minima.

8. The method of claim 1, wherein the fixed positions of the first fixed electromagnetic element and the second fixed electromagnetic element are intentionally spaced apart to cause destructive interference between the first signal and the second signal.

9. The method of claim 1, wherein the digitally optimized interference pattern is a digitally optimized near-field interference pattern.

10. The method of claim 9, wherein the first fixed electromagnetic element and the second fixed electromagnetic element are co-located on the same printed circuit board.

11. The method of claim 1, wherein the first fixed electromagnetic element and the second fixed electromagnetic element are electrical elements of an integrated circuit chip package.

12. The method of claim 1, wherein the first fixed electromagnetic element and the second fixed electromagnetic element are electrical antennas.

13. The method of claim 12, wherein the first fixed electromagnetic element and the second fixed electromagnetic element are at least partially encapsulated in a common medium.

14. The method of claim 1, wherein the first fixed electromagnetic element and the second fixed electromagnetic element are similar electrical antennas.

15. The method of claim 1, wherein the first fixed electromagnetic element and the second fixed electromagnetic element are non-similar electrical antennas.

16. The method of claim 1, wherein the first fixed electromagnetic element or the second fixed electromagnetic element is a ground plane of a printed circuit board.

17. The method of claim 1, wherein the first fixed electromagnetic element or the second fixed electromagnetic element is a planar micro-strip antenna.

18. The method of claim 1, wherein the first fixed electromagnetic element and/or the second fixed electromagnetic element are printed antennas.

19. The method of claim 18, wherein the first fixed electromagnetic element and the second fixed electromagnetic element are separated by a dielectric layer of a printed circuit board.

20. The method of claim 1, wherein the radiation source is a moving electromagnetic radiation source.

* * * * *